United States Patent [19]
Moncrieff

[11] 3,710,685
[45] Jan. 16, 1973

[54] GEAR MAKING

[75] Inventor: Alexander D. F. Moncrieff, Marion, Mass.

[73] Assignee: Bird Island, Inc., Boston, Mass.

[22] Filed: July 15, 1971

[21] Appl. No.: 162,866

[52] U.S. Cl. ............................................. 90/3, 90/9.6
[51] Int. Cl. ................................................. B23f 5/20
[58] Field of Search ......................... 90/3, 4, 5, 9, 9.6

[56] References Cited

UNITED STATES PATENTS

| | | | |
|---|---|---|---|
| 2,857,819 | 10/1958 | Wildhaber et al. | 90/5 |
| 1,797,227 | 3/1931 | Fickett | 90/3 |
| 1,516,524 | 11/1924 | Fellows | 90/3 |

Primary Examiner—Gil Weidenfeld
Attorney—Robert E. Hillman

[57] ABSTRACT

Gear making machine of the type in which a workpiece undergoes continuous indexing rotation with respect to a rotating cutter, the cutter being rotated through a worm, the worm being mounted for translation along its axis to superimpose upon the indexing rotation of the cutter a differential cutter rotation related to the feed of a workpiece slide through a cutting cycle, including a rotationally driven cam mounted endwise of the worm to produce the worm translation in correspondence to the rise or fall of the cam.

8 Claims, 5 Drawing Figures

PATENTED JAN 16 1973

GEAR MAKING

BACKGROUND OF THE INVENTION

1. Field of the Invention

This invention relates to gear making machines of the type in which a workpiece undergoes continuous indexing rotation with respect to a rotating cutter, and a differential rotation is superimposed upon the indexing rotation of the cutter as the workpiece is fed through the cutting cycle.

2. Description of the Prior Art

Such a machine is described in U.S. Pat. application Ser. No. 844,925 filed by Paul Maker on July 25, 1969 now U.S. Pat. No. 3,595,130. In that application, the differential cutter rotation is related to workpiece feed through a lever extending between the workpiece slide and the worm-carrying shaft through which the cutters are rotated.

SUMMARY OF THE INVENTION

In general the invention features a rotationally driven cam mounted endwise of the worm to produce translation of the worm in correspondence to the rise or fall of the cam, the differential rotation of the cutter thus being wholly dependent upon the shape of the cam. In preferred embodiments the cam is carried on a shaft extending transversely to a worm-carrying shaft to adjacent the workpiece slide, mechanical linkage being provided between the cam-carrying shaft and the slide to control the rate of slide feed in accordance with rotation of the cam-carrying shaft; the mechanical linkage includes a face cam carried adjacent the slide on the same shaft that carries the other cam, and a lever pivotal about an axis parallel to the axis of the worm-carrying shaft and having arms respectively bearing against the face cam and the slide; one of the lever arms has an adjustable portion to vary its effective length, thereby determining the radius of the generating circle of the gear being made; and the worm-carrying shaft is coupled to a cam-following member adjustable with respect to the worm along the worm axis, to determine tooth thickness in the gear being made.

Gears are thus cut with increased accuracy, since mechanical deflection is minimized in the overall mechanical linkage relating differential cutter rotation to translation of the workpiece slide.

Other features and advantages of the invention will be apparent from the description and drawings herein of a preferred embodiment thereof.

DESCRIPTION OF THE PREFERRED EMBODIMENT

Figure 1:
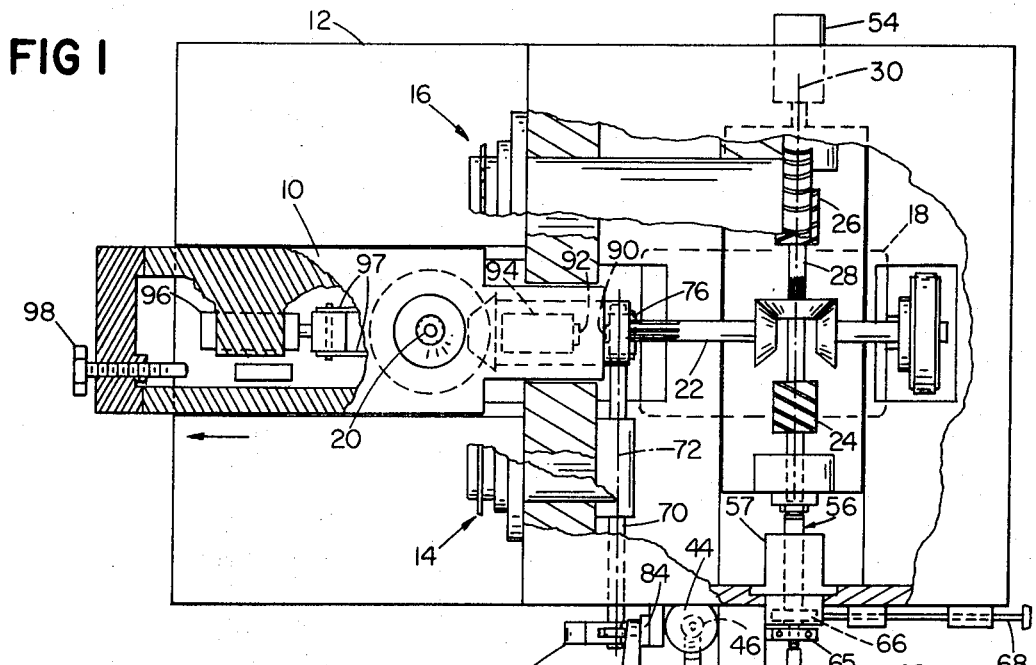
FIG. 1 is a plan view partially in section of a fragment of a gear making machine.

Referring to the drawings, workpiece slide 10 is mounted on frame 12 for linear translation relative to cutters 14 and 16. Motor 18 rotates workpiece 20 through splined shaft 22, and rotates cutters 14 and 16 through worms 24 and 26 on shaft 28, these rotations occurring at basic indexing rates so long as slide 10 is stationary. Shaft 28 is mounted to permit its translation along its own axis 30, for imparting to the cutters differential rotation so that the teeth of the gear being made will have the desired profiles. In these and other respects unnecessary to detail here the machine is, with the exception of the improvement to be described, in substance the same as that described in the above-identified application, the disclosure of which is incorporated herein by reference.

Shaft 40 is mounted for rotation about axis 42 parallel to the direction of workpiece feed, driven by adjustable speed hydraulic motor 44 through worm 46 and worm gear 48. Shaft 40 extends along the side of the machine from just forward of slide 10 to adjacent shaft 28, and has mounted on its opposite ends face cam 50 and plate cam 52.

Figure 2:
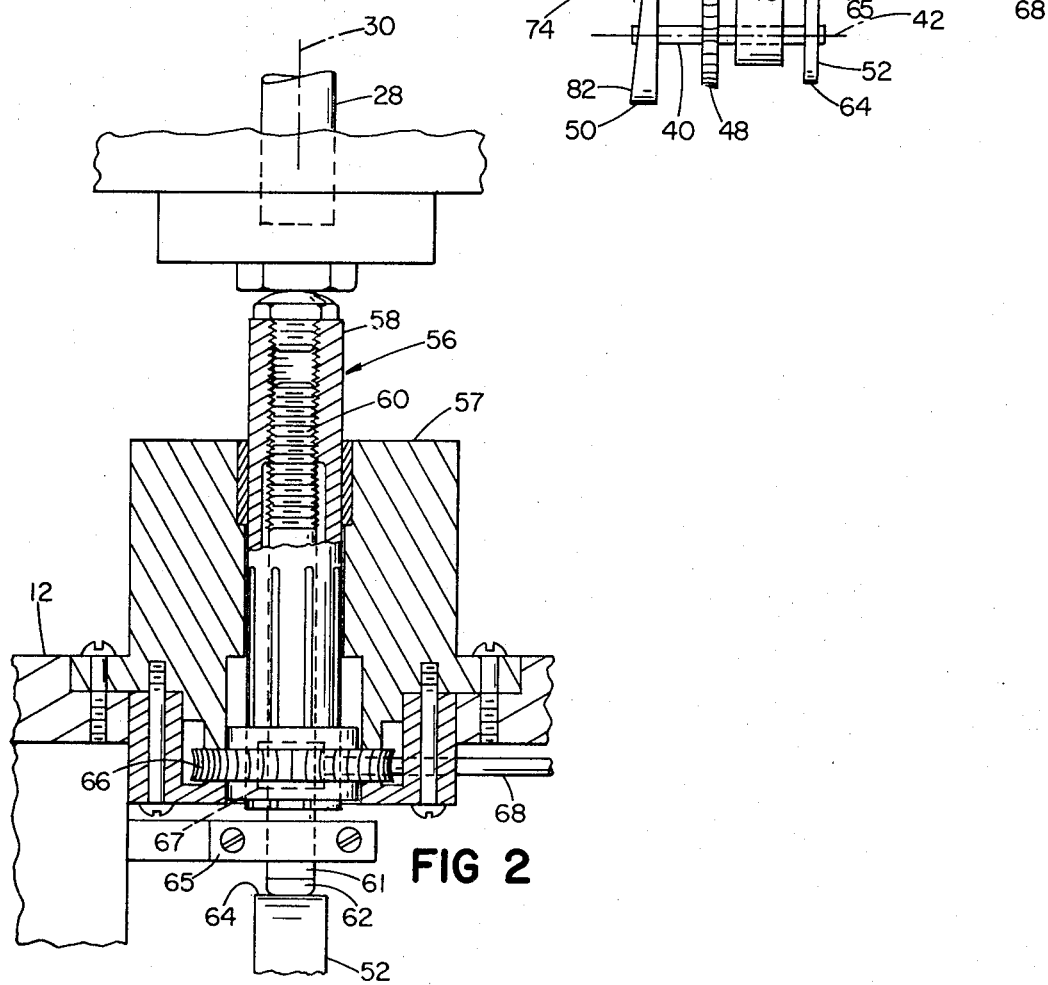
FIG. 2 is an enlargement, further sectioned, of a fragment of FIG. 1.

Shaft 28 is biased toward cam 52 by hydraulic cylinder 54 mounted on frame 12 at the end of the shaft assembly opposite the cam. The shaft assembly bears against adjustable length element 56 mounted to slide in bearing block 57 fixed to frame 12, and comprising a nut 58 (FIG. 2) contacting the shaft assembly and a screw 60 threaded inside nut 58 and contacting operative cam surface 64 through carbide button 62. End portion 61 of screw 60 is of rectangular cross-section and passes through a rectangular opening in retaining bar 65 fixed to frame 12, to prevent rotation of screw 60. Worm gear 66 is splined to nut 58 and is arranged to be rotationally adjusted by worm 67 carried by manually operable rod 68. Rotation of rod 68 thus causes rotation of nut 58 relative to screw 60, changing the length of element 56 and hence the initial position of shaft 28 in the cutting cycle, thus controlling the initial phase angle between the cutters and hence the tooth thickness of the gear being made.

Figure 3:
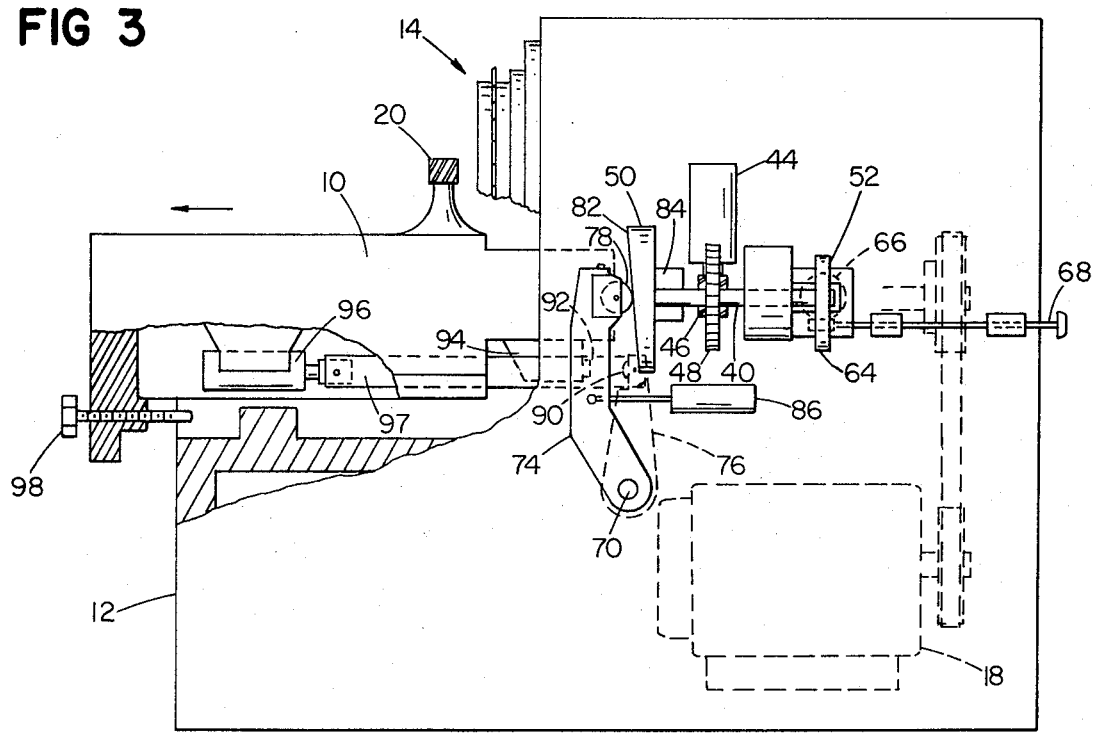
FIG. 3 is a side elevation, partially in section, of the machine of FIG. 1.

Lever shaft 70 (FIG. 1), with its axis 72 parallel to axis 30 of shaft 28, extends through the wall of frame 12 near slide 10, and has fixed to its ends, respectively (see especially FIG. 3), outside lever arm 74 and inside lever arm 76.

Figure 5:
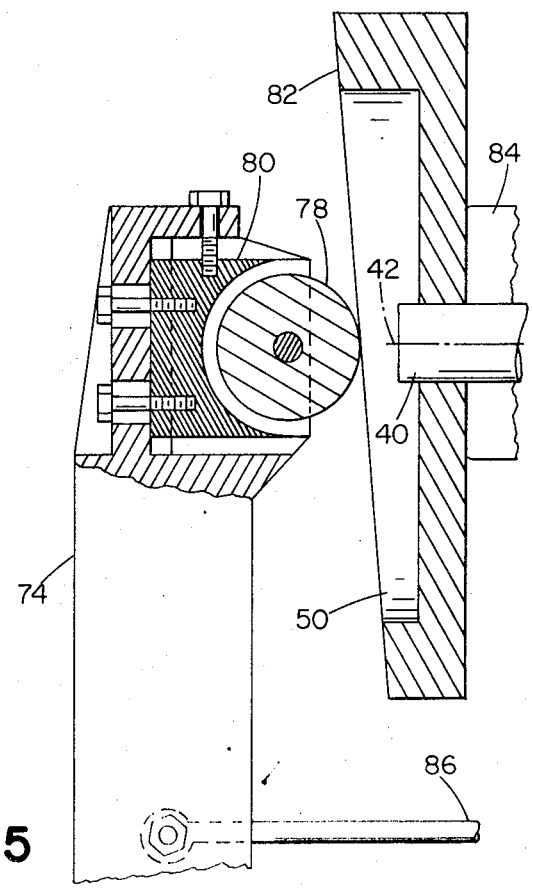
FIG. 5 is an enlargement, further sectioned, of a fragment of FIG. 3.

At the top of arm 74 (FIG. 5) cam-following roller 78 is mounted on vertically adjustable block 80, and bears against the operative surface 82 (that surface being generally transverse to axis 42) of cam 50. Hydrostatic bearing 84 bears against the back of cam 50 opposite roller 78 to prevent cam deflection. Hydraulic cylinder 86 biases arm 74 toward cam 50.

Figure 4:
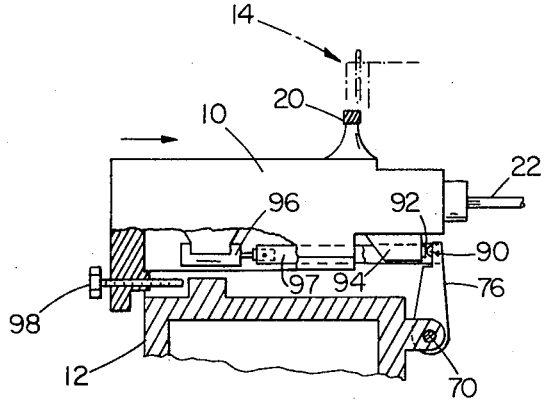
FIG. 4 is a side elevation of a portion of the machine of FIG. 3, with the workpiece slide in a more forward position.

At the top of lever arm 76 carbide button 90 bears against another carbide button 92 fixed to bracket extension 94 at the front of slide 10. Hydraulic cylinder 96, mounted on the underside of slide 10 with its piston rod coupled to arm 76 through straps 97 (the straps being pivotally connected to both the piston rod and arm 76), acts during the cutting cycle to hold slide 10 against arm 76 (FIG. 4). (Cylinder 96 also provides the rapid in and out (FIG. 3) motion of the slide during the loading and unloading cycle, as described in the above-identified application.) Adjustable stop screw 98 at the back of slide 10 acts by abutment against frame 12 to limit forward motion of the slide.

In operation, with shaft 40 rotating at constant velocity, the rise and fall of cam surface 82 will cause lever shaft 70 and arms 74 and 76 to pivot forward and then back, during the infeed and outfeed portions of the cutting cycle, respectively, thus feeding slide 10 forward during the infeed and reversing the slide motion during the outfeed. The rate of translation of the slide (for a given rate of rotation of shaft 40) is determined by the shape of cam surface 82 and the ratio of the effective lengths of arms 74 and 76 (that ratio, and hence the generating circle radius of the gear being made, being subject to fine adjustment by raising or lowering block 80). At the same time, the rate of translation of shaft 28 along its axis 30 (and, hence, the differential rate of cutter rotation) is determined solely by the shape of cam surface 64 (for a given rate of rotation of shaft 40). Thus, e.g., to finish unmodified involute profiles during the outfeed requires differential cutter rotation linearly related to the workpiece feed rate; hence the radius of the portion of cam surface 64 that contacts button 66 during the outfeed must change at a rate (per degree of cam rotation) linearly related to the corresponding rate of change of the height of surface 82. Similarly, non-linear relationships between surfaces 64 and 82 can produce non-involute profiles, infeed roughing, or the like, following the general principles of cutter phase control taught in the above-identified application.

Other embodiments are within the following claims.

What is claimed is:

1. In gear making apparatus comprising a cutter being rotatably mounted, means mounting a work piece for a predetermined rate of rotation with respect to said rotatable cutter, a worm drivingly associated with said cutter for rotating same, slide means for linearly feeding the work piece relative to said cutter, means supporting said worm for translation along its axis to superimpose upon the rotation of the cutter a differential cutter rotation, means regulating the differential cutter rotation in relation to the linear feed rate of said slide means during a cutting cycle, said regulating means including a rotationally driven cam mounted endwise of said worm supporting means and cooperating therewith to produce said translation in correspondence to the shape of the cam.

2. The improvement of claim 1 wherein said cam is carried on a shaft extending transversely to the worm axis to adjacent the workpiece slide means, mechanical linkage being provided between said shaft and the slide means to control the rate of slide means feed in accordance with rotation of said shaft.

3. The improvement of claim 2 wherein said mechanical linkage includes a second cam carried on said shaft.

4. The improvement of claim 3 wherein said second cam has its operative cam surface transverse to the axis of said shaft.

5. The improvement of claim 2 wherein said mechanical linkage includes a lever having a pivot axis parallel to the worm axis.

6. The improvement of claim 5 wherein a second cam is mounted for rotation adjacent the slide means and said lever has arms respectively bearing against the slide means and said second cam.

7. The improvement of claim 2 wherein said mechanical linkage includes a lever having a portion adjustable to vary the effective lever arm ratio thereby to determine the generating circle radius of the gear being made.

8. The improvement of claim 1 wherein the worm is mounted on a shaft coupled to a cam-following member adjustable with respect to the worm along the worm axis, to determine tooth thickness in the gear being made.

* * * * *